United States Patent
Vishik et al.

(10) Patent No.: US 7,630,478 B2
(45) Date of Patent: *Dec. 8, 2009

(54) METHOD AND SYSTEM FOR MULTIMODAL PRESENCE DETECTION

(75) Inventors: Claire Svetlana Vishik, Austin, TX (US); Sreenivasa Rao Gorti, Austin, TX (US); Paul Van Vleck, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/418,281

(22) Filed: May 4, 2006

(65) Prior Publication Data

US 2006/0203973 A1    Sep. 14, 2006

Related U.S. Application Data

(63) Continuation of application No. 10/806,935, filed on Mar. 23, 2004, now Pat. No. 7,065,184, which is a continuation of application No. 09/990,760, filed on Nov. 16, 2001, now Pat. No. 6,735,287.

(51) Int. Cl.
    *H04M 1/64* (2006.01)
(52) U.S. Cl. ............. 379/88.02; 370/401; 379/88.17; 379/88.19; 455/412.2; 713/169; 713/186
(58) Field of Classification Search ............. 379/88.02, 379/67.1, 88.19, 201.06, 88.17; 713/185, 713/176, 186, 169; 709/217, 206; 705/39; 455/411, 412.2; 370/401
    See application file for complete search history.

(56) References Cited

U.S. PATENT DOCUMENTS

| 4,757,525 | A | | 7/1988 | Matthews et al. |
| 5,493,692 | A | | 2/1996 | Theimer et al. |
| 5,515,426 | A | | 5/1996 | Yacenda et al. |
| 5,550,907 | A | | 8/1996 | Carlsen |
| 5,652,789 | A | | 7/1997 | Miner et al. |
| 5,742,668 | A | * | 4/1998 | Pepe et al. ............... 455/415 |
| 5,742,905 | A | | 4/1998 | Pepe et al. |
| 5,870,723 | A | * | 2/1999 | Pare et al. ................ 705/39 |
| 5,894,478 | A | * | 4/1999 | Barzegar et al. ........... 370/401 |
| 5,930,804 | A | | 7/1999 | Yu et al. |
| 5,943,478 | A | | 8/1999 | Aggarwal et al. |
| 5,946,386 | A | | 8/1999 | Rogers et al. |

(Continued)

OTHER PUBLICATIONS

.NET Alerts Frequently asked Questions; http://www.microsoft.com/myservices/alerts/faq.asp, (9 pages), Oct. 28, 2001.

*Primary Examiner*—Gerald Gauthier
(74) *Attorney, Agent, or Firm*—Brinks Hofer Gilson & Lione

(57) ABSTRACT

A presence device operable in a first mode and a second mode is associated with a communication device. In the first mode, a user using the presence device is biometrically authenticated and a presence confirmation input is received from the communication device. In the second mode, a user-entered log-in input is received from the communication device. A central presence database is updated to indicate that the communication device is active for the user. A received message which is to be routed to the user is sent to the active device indicated by the central presence database.

19 Claims, 2 Drawing Sheets

U.S. PATENT DOCUMENTS

| | | |
|---|---|---|
| 5,956,485 A | 9/1999 | Perlman |
| 5,987,508 A * | 11/1999 | Agraharam et al. ......... 709/217 |
| 6,151,676 A * | 11/2000 | Cuccia et al. ............... 713/176 |
| 6,181,780 B1 * | 1/2001 | Finnigan .................... 379/67.1 |
| 6,205,139 B1 | 3/2001 | Voit |
| 6,219,793 B1 | 4/2001 | Li et al. |
| 6,246,751 B1 | 6/2001 | Bergl et al. |
| 6,260,148 B1 | 7/2001 | Aggarwal et al. |
| 6,263,064 B1 | 7/2001 | O'Neal et al. |
| 6,343,115 B1 | 1/2002 | Foladare |
| 6,480,580 B1 | 11/2002 | Beswick et al. |
| 6,640,302 B1 * | 10/2003 | Subramaniam et al. ..... 713/169 |
| 6,651,168 B1 * | 11/2003 | Kao et al. .................... 713/185 |
| 6,735,287 B2 | 5/2004 | Vishik et al. |
| 7,065,186 B1 * | 6/2006 | Myers et al. ............. 379/88.17 |
| 7,114,080 B2 * | 9/2006 | Rahman et al. ............. 713/186 |
| 7,194,632 B2 * | 3/2007 | Guerin et al. ............... 713/186 |
| 7,269,627 B2 * | 9/2007 | Knauerhase ................ 709/206 |
| 7,283,805 B2 * | 10/2007 | Agrawal .................. 455/412.2 |
| 2001/0003202 A1 | 6/2001 | Mache et al. |
| 2002/0026513 A1 | 2/2002 | Hoglund et al. |
| 2002/0035606 A1 | 3/2002 | McDowell et al. |
| 2002/0104006 A1 * | 8/2002 | Boate et al. ................. 713/186 |
| 2003/0097413 A1 | 5/2003 | Vishik et al. |
| 2006/0203973 A1 * | 9/2006 | Vishik et al. ............... 379/67.1 |

* cited by examiner

this, an

METHOD AND SYSTEM FOR MULTIMODAL PRESENCE DETECTION

RELATED APPLICATIONS

The present application is a continuation of U.S. patent application Ser. No. 10/806,935, filed Mar. 23, 2004, now U.S. Pat. No. 7,065,184 which is a continuation of U.S. patent application Ser. No. 09/990,760 (now U.S. Pat. No. 6,735, 287), filed Nov. 16, 2001, and the entirety of each are both hereby incorporated herein by reference.

The present application also relates to U.S. patent application Ser. No. 09/990,761, filed Nov. 16, 2001, the entirety of which is hereby incorporated herein by reference.

TECHNICAL FIELD

The present invention relates to methods and systems for presence detection.

BACKGROUND

Presence management refers to the task of identifying whether a given user is available to receive a communication. The concept originated, at least in part, in instant messaging products such as those provided by AOL, Yahoo and MSN. In a typical scenario, a user's availability or presence is registered into an application-specific database in response to the user logging in to a particular software application. When other users wish to contact the user, the availability is obtained from the database using an application-specific protocol. In these scenarios, presence management is tied to particular software applications (e.g. AOL, Yahoo, MSN, and instant messaging products). The applications establish presence, with some user control, when the user logs in to an application. This method limits the information to the particular applications, and is not usable from outside the application for which it was designed.

In today's applications, presence management usually requires an effort on the user's part. Normally, the user creates a profile to regulate presence management and to keep it current. Moreover, he or she must log into a device to initiate presence management monitoring. Finally, presence management is dependent upon a software application and/or device to which it is linked.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Briefly, embodiments of the present invention provide an improved presence detection method and system using a presence device which can be either attached to or embedded in various communication devices, including but not limited to a computer, a telephone and a personal digital assistant (PDA). The presence device is operable in two or more modes. In an implicit mode, a user's presence—that is, an ability to view and respond to communications—is established with little or no effort on the user's part. In the implicit mode, the presence device is trained to authenticate the owner either from one or more fingerprints, using voice recognition, or another biometric technique. In an explicit mode, the user's presence is established using a log-in input, such as a password.

When the user is authenticated as the owner, and if the communication device is set up to support the implicit mode, the user is questioned if the messages should be delivered to the device that is currently active. This may override preferences set in a user's profile.

The presence device communicates with a presence management and detection Web service while establishing presence. The Web service may be polled by a routing system to facilitate real-time detection of available parties and their active devices, and dynamic selection of a desirable route to process messages. The desirable route may comprise either a near-optimal route, or in an exemplary embodiment, an optimal route to process a message faster and more efficiently. The herein-disclosed routing solution is well-suited for business applications.

Figure 1:
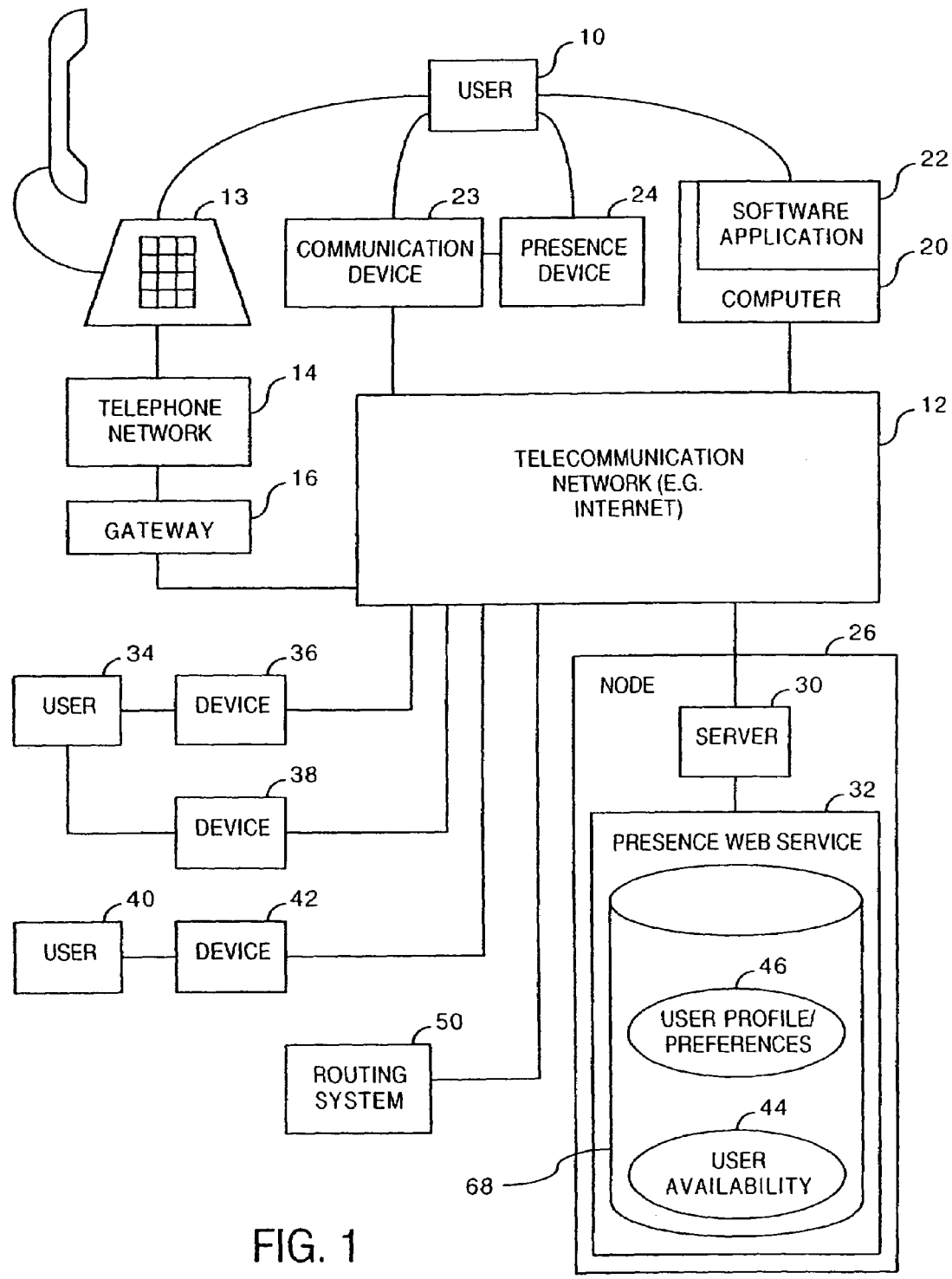
FIG. 1 is a schematic block diagram of an embodiment of a system to provide presence information.

FIG. 1 is a schematic block diagram of an embodiment of a system to provide presence information. Consider a user 10 who accesses a telecommunication network 12 such as the Internet or another computer network. The user 10 may access the telecommunication network 12 using either a telephone 13 via a telephone network 14 and a gateway 16, a computing device such as a computer 20 running a software application 22, or a communication device 23 having an associated presence device 24. For any of the aforementioned ways that the user 10 accesses the telecommunication network 12, information indicating the presence of the user is compiled and made available by a node 26 of the telecommunication network 12. The node 26 may comprise a computer server 30 which provides a Web service 32 defined as a distributed service accessible over the telecommunication network 12 (e.g. the Internet) using ubiquitous protocols such as Simple Object Access Protocol (SOAP) and Extensible Markup Language (XML) over Hypertext Transfer Protocol (HTTP). The computer server 30 may comprise a JAVA.™. 2 Platform Enterprise Edition (J2EE)/.NET application server, for example.

This disclosure contemplates a multiplicity of users of the telecommunication network 12 whose presence information is compiled and made available using the Web service 32. For example, the Web service 32 may provide presence information for a user 34 having two associated devices 36 and 38, and a user 40 having an associated device 42. Examples of the devices 36, 38 and 42 include, but are not limited to, those described in association with the user 10.

The Web service 32 decouples presence information from a particular application, and makes the presence information available as a network function. Separating presence management as a component service available from the telecommunication network 12 facilitates flexibility both for users to publish their presence information and for consuming applications to consume the presence information. As a result, cross-application services are enabled. For example, indicating unavailability on a personal computer internet messaging (PC-IM) client can be interpreted as a user directive to the telecommunication network 12 to hold off cellular telephone calls and/or to take messages.

The Web service 32 can be used in multiple applications, including but not limited to instant messaging, video conferencing, chat, business-to-business applications such as document routing for approval, and routing notifications to an appropriate device. The presence information may be published in multiple modes, including but not limited to a Web browser, a Voice XML application, a mobile telephone, and a specialized presence device. The presence information may be either explicitly updated by the user or implicitly handled by various devices and/or software applications.

The presence information can be consumed by multiple devices, including but not limited to a Web browser, a mobile telephone, a personal computer, a personal digital assistant and a Web tablet. Independent of the actual presence information, the service may provide other information such as updatable and consumable user availability information 44, user/device profile and preference information 46, device status information and user location information.

Figure 2:
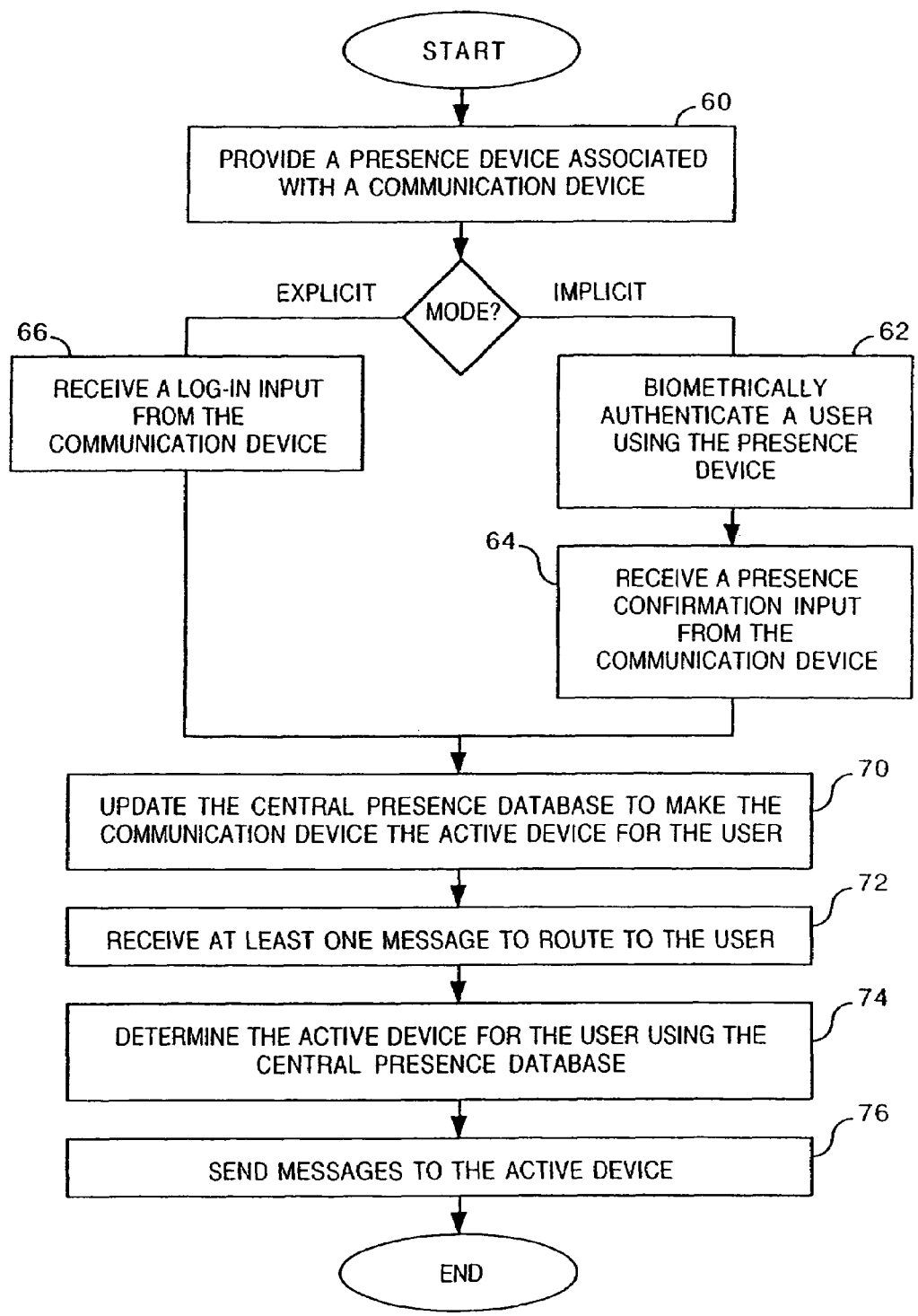
FIG. 2 is a flow chart of an embodiment of a method of multimodal presence detection.

A routing system 50 intelligently routes messages and documents based on presence information provided by the Web service 32. An embodiment of a method performed using the Web service 32 and the routing system 50 is described with reference to FIG. 2.

As indicated by block 60, the method comprises providing a presence device associated with a communication device. The presence device may be either embedded with the communication device or interfaced with and removable from the communication device. For purposes of illustration and example, the description of the method is made with reference to the presence device 24 and the communication device 23 in FIG. 1.

The presence device 24 is operable in a first mode and a second mode. The first mode may be referred to as either an implicit mode or a passive mode, and the second mode may be referred to as either an explicit mode or an active mode.

If the presence device 24 is operating in the implicit mode, an act of biometrically authenticating the user 10 using the presence device 24 is performed as indicated by block 62. The presence device 24 comprises a biometric device to assist in performing the authentication. Examples of the biometric device include, but are not limited to, a voice authentication device and a fingerprint matching device. Optionally, the presence device 24 may have both voice authentication capability and fingerprint authentication capability.

The voice authentication device may be embedded on a chip or a smart card, for example. Examples of voice authentication solutions include TESPAR™ from Domain Dynamics Limited and Voice Security Systems (VSS). The VSS solution is able to verify a human voice in a few seconds on a fully self-contained 8 kB smart card running at 3.57 Mhz. For embedded voice authentication systems, a capture device is also used.

The fingerprint authentication device may be embedded on a chip or a smart card, for example. Examples of fingerprint authentication solutions include FINGERCHIP™ from Atmel Corp. The FINGERCHIP™ device is a fingerprint scanner on a chip. Identicator Technology produces a package that, instead of creating an image of a fingerprint, creates a personal identification number (PIN) from the fingerprint. One fingerprint PIN uses 50 bytes of storage for a one-to-one matching solution, or 250 to 400 bytes for a one-to-many match. In contrast, an image of a fingerprint may use up to 150 kB of storage. Regardless of the approach used, either a fingerprint image or a fingerprint PIN can be matched either with a copy internal to the presence device or, if relevant, a copy stored by the Web service 32.

The type of authentication is suited to the type of communication device 23 to which the presence device is attached or embedded. For example, if the communication device 23 comprises a telephone (either wireless such as a cellular telephone, or wireline), the act of biometrically authenticating may comprise authenticating a voice of the user 10 during a call using the telephone. As the user 10 begins to talk on the telephone in a call between the user 10 and another party, his/her voice is authenticated. The user's voice is authenticated independent of the other party. The user 10 may be either a calling party or a called party of the call.

If the communication device 23 comprises a computer, a personal digital assistant or another device having a keyboard, the act of biometrically authenticating the user 10 may comprise authenticating a fingerprint of the user 10 as the user types using the keyboard. The user's fingerprint is authenticated independent of a software application for which the user 10 is typing using the keyboard.

Upon biometrically authenticating the user 10, the method may further require an act of receiving a presence confirmation input from the communication device 23, as indicated by block 64. An audible message or a visible message may be displayed by the communication device 23 to prompt the user 10 to provide the presence confirmation input. .cndot. For example, the communication device 23 may include a visual display which displays a message such as "Confirm presence?". Alternatively, the communication device 23 may include a speaker or a like audio output device which audibly outputs a message such as "Confirm presence?".

In response to the prompt, the user 10 may use an input device included in the communication device 23 either to provide the presence confirmation input (indicating that the communication device is to be considered as active) or to provide an input indicating that the communication device 23 is not to be considered as active. For example, the presence confirmation input may comprise an affirmative input such as "Yes", "Y", "true" or another input indicating same. An input indicating that the communication device is not to be considered as active may comprise a negative input such as "No", "N", "false" or another input indicating same. The presence confirmation input may comprise one or more keystrokes of a keyboard or keypad, an input using a touchscreen, or a voice input using a microphone of the communication device 23.

One or more signals associated with the biometric authentication and the presence confirmation are communicated from the communication device 23 to the Web service 32 via the telecommunication network 12. The one or more signals contains information identifying the user 10 and the communication device 23. The Web service 32 uses the aforementioned one or more signals to determine that the communication device 23 is to be considered as the active device for the user 10.

If the presence device 24 is operating in the explicit mode, an act of receiving a user-entered log-in input from the communication device 23 is performed as indicated by block 66. The user-entered log-in input may comprise a password, personal identification code, or the like entered using the communication device 23. Either the log-in input or an indication that the log-in input authenticates the user is communicated from the communication device 23 to the Web service 32 via the telecommunication network 12.

In response to the acts in blocks 62 and 64, or the act in block 66, the Web service 32 receives one or more authentication signals from the communication device 23. Upon accepting a signal, the Web service 32 updates a central presence database 68 to indicate that the communication device 23 is active for the user 10 (block 70).

Using the aforementioned method, the presence of each user (10, 34 or 40) is detectable by the Web service 32 either implicitly or explicitly for a plurality of different communication devices. Further, the presence of the each user (10, 34 or 40) is detectable independent of whether the user logs in to a particular software application (e.g. an instant messaging application). Still further, the Web service 32 preferably provides presence information for a plurality of different software applications, one of which being a hereinafter-described routing application.

As indicated by block 72, the routing system 50 receives at least one message to be routed to the user 10. The message may be received either before or after updating the central presence database 68 in block 70.

As indicated by block 74, the routing system 50 communicates with the central presence database 68 to determine which communication device is active for the user 10. The routing system 50 accesses the central presence database 68 via the Web service 32 and the telecommunication network 12. Continuing with the above example, the central presence database 68 communicates to the routing system 50 that the communication device 23 is active for the user 10.

As indicated by block 76, the routing system 50 sends the at least one message to the communication device 23. Optionally, the routing system 50 formats the presentation of each message based on the type of communication device which is active. The message may be coded in a markup language, such as XML for example.

The aforementioned routing acts may be a component of various business applications, from supply chain management to procurement and billing. For example, after receiving a request that needs to be routed to a process owner, the routing system 50 contacts the Web service 32 to detect presence and active devices for those authorized to approve a request. If the routing system 50 is set up to operate in an automated mode, the availability of a main approver and his/her active device is checked. If the main approver is available, the request is routed to the main approver's active device. If the presence of the main approver is not detected and the time allocated for his/her approval expires, the presence Web service 32 is polled to detect presence and active devices of secondary or alternative approvers. Consequently, the routing system 50 routes requests according to the rules set up in the presence-based routing applications.

The herein-disclosed method and system allows organizations to speed up business processes involving mobile and distributed work force. Additionally, the presence-based routing system can be built to be application-independent to work with various business systems, in contrast to current routing systems which are applications-driven.

A more specific example is given to further motivate use of embodiments of the herein-disclosed method and system. Consider the user 10 logging into the computer 20 that is set up for accepting the passive mode for presence. As he/she begins typing, he/she is authenticated, and the computer 20 is considered as the active device for the user 10. Messages and notifications are thereafter routed to the computer 20. The user 10 reads three messages: a notice from a billing system that a bill is coming due, an invitation to start a video conference, and a notification about bad weather in the place where he/she plans to travel.

The user's cellular telephone 13 then rings. The telephone 13 contains a presence card (not illustrated). As the user 10 begins to talk after answering the call, he/she is authenticated as the owner. A message comprising "Confirm presence?" is played to the user 10. The user 10 presses the "#" key (the key for "No") and continues talking. The alerts continue to be delivered to the computer 20.

After completing the call, the user 10 leaves his/her office to go to a meeting, taking his/her PDA 23 with him/her. The PDA 23 also contains a presence device 24. The user 10 touches a button on the PDA 23 and is authenticated. A message appears asking the user 10 if the PDA 23 is his/her active device. The user 10 presses "yes". Subsequent notifications are delivered to the PDA 23.

It is noted that the routing system 50 may comprise a computer system to perform the acts described herein. The computer system may be directed by computer-readable program code stored by a computer-readable medium. Similarly, the acts performed by the node 26 may be directed by computer-readable program code stored by a computer-readable medium.

Several embodiments including preferred embodiments of a method and system for multimodal presence detection are disclosed herein.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

The invention claimed is:

1. A method for detecting a presence of a user comprising:
biometrically authenticating a user with a presence module coupled with a communication module;
requesting a presence confirmation input from the user with the presence module in response to biometrically authenticating the user;
receiving the presence confirmation input from the user at the presence module; and
routing a received message for the user to the communication module with a routing system, the routing based on the biometric authentication of the user and the presence confirmation input from the user.

2. The method of claim 1, further comprising:
sending an indication that the communication module is active for the user to receive at least one message in response to receiving the presence confirmation input.

3. The method of claim 1 wherein the communication module comprises a telephone, and wherein said biometrically authenticating comprises authenticating a voice of the user during a call using the telephone.

4. The method of claim 3 wherein the call is made between the user and a party, and wherein said authenticating the voice of the user is independent of the party.

5. The method of claim 3 wherein the user is a calling party of the call.

6. The method of claim 4 wherein the user is a called party of the call.

7. The method of claim 1 wherein the communication module comprises a keyboard, and wherein said biometrically authenticating comprises authenticating a fingerprint of the user as the user types using the keyboard.

8. The method of claim 7 wherein said authenticating a fingerprint of the user is independent of a software application for which the user types using the keyboard.

9. The method of claim 1 wherein the presence module is embedded with the communication module.

10. The method of claim 1 wherein the presence module is removably interfaced with the communication device.

11. A computer-readable storage medium comprising a set of instructions for detecting a presence of a user, the set of instructions to direct a processor to perform acts of:
biometrically authenticating a user with a presence module coupled with a communication module;
requesting a presence confirmation input from the user in response to biometrically authenticating the user;

receiving the presence confirmation input from the user; and routing a received message for the user to the communication module, the routing based on the biometric authentication of the user and the presence confirmation input from the user.

12. The computer-readable storage medium of claim 11, further comprising a set of instructions to direct the computer to perform acts of:

sending an indication that the communication module is active for the user to receive at least one message in response to receiving the presence confirmation input.

13. A system comprising:

a communication module; and a presence module associated with the communication module, the presence module operable in a first mode and a second mode;

wherein the presence module is operable to biometrically authenticate a user, request a presence confirmation input from the user in response to biometrically authenticating the user, and receive the presence confirmation input from the user when the presence module is operating in a first mode and to authenticate a user based on a user-entered log-in input from the user when the presence module is operating in a second mode; and wherein when the communication module is operating in the first mode, messages received for the user are routed to the communication module, the routing based on the biometric authentication of the user and the presence confirmation input from the user.

14. The system of claim 13, wherein the communication module is operable to send an indication that the communication module is active for a user to receive at least one message in response to the presence module receiving a presence confirmation input.

15. The system of claim 13, wherein the presence module is embedded with the communication module.

16. The system of claim 15, wherein the communication module is a phone.

17. A computer-readable storage medium comprising a set of instructions to direct a processor to perform acts of:

indicating that a communication module is active for a user to receive at least one message in response to biometric authentication of a user and receipt of a presence confirmation input requested from the user in response to biometric authentication of the user when a presence module associated with the communication device is operating in a the first mode; and indicating that the communication module is active for the user to receive at least one message in response to authentication of a received user-entered log-in input when the presence module is operating in the second mode.

18. The computer-readable storage medium of claim 17, wherein the communication module is a phone.

19. The computer-readable storage medium of claim 18, wherein the presence module is embedded with the phone.

* * * * *